June 13, 1939.　　　G. M. PELTZ　　　2,162,116

TEMPERATURE CONTROL

Filed Oct. 13, 1933　　　3 Sheets-Sheet 1

INVENTOR
GORDON M. PELTZ
By　　　　　
ATTORNEYS

June 13, 1939.  G. M. PELTZ  2,162,116

TEMPERATURE CONTROL

Filed Oct. 13, 1933    3 Sheets-Sheet 2

INVENTOR
GORDON M. PELTZ
By Paul, Paul Moore
ATTORNEYS

June 13, 1939.  G. M. PELTZ  2,162,116

TEMPERATURE CONTROL

Filed Oct. 13, 1933  3 Sheets-Sheet 3

INVENTOR
GORDON M. PELTZ
By Paul, Paul & Moore
ATTORNEYS

Patented June 13, 1939

2,162,116

UNITED STATES PATENT OFFICE 2,162,116

TEMPERATURE CONTROL

Gordon M. Peltz, Elmhurst, New York, N. Y., assignor to Minneapolis-Honeywell Regulator Company, Minneapolis, Minn., a corporation of Delaware Application October 13, 1933, Serial No. 693,457

16 Claims. (Cl. 236—46)

This application is a continuation in part of my application Serial No. 567,063 filed October 5, 1931.

My invention relates to the control of conditions such as steam pressure, temperature and the like. From a more specific aspect also, it relates particularly to the control of temperature.

Generally speaking, my invention enables one to hold the condition at more nearly the desired value or values than has been possible heretofore, at least with relatively simple apparatus of general application.

Thermostatic elements are known, e. g. a bi-metallic element, which is capable of holding a temperature at very close to a desired value, providing the thermostatic element is arranged to activate a suitable heat source immediately the temperature falls below some certain degree and to more or less deactivate the heat source again immediately the temperature rises above the same certain degree. Such thermostatic elements are so sensitive to temperature changes and to slight mechanical forces however, that simple thermostatic arrangements of this kind are undesirable in certain situations, such as in the control of the heating of living rooms and homes, since in such systems parts are brought into action with annoying frequency.

Heretofore various expedients have been adopted to reduce this frequency, practically all of which, so far as I am aware, are dependent on or involve activation of the heat source at a temperature different from that at which the heat source is deactivated. This "temperature difference", or difference between the temperatures at which the heat source is activated and deactivated, in itself causes the temperature of the space being heated to depart from the desired value or degree of course; and further, all these expedients, so far as I am aware, involve regularly or occasionally a materially greater "temperature difference" than is necessary to avoid the annoyances of the simpler thermostatic arrangement mentioned above, and hence directly by reason of the "temperature difference" regularly or occasionally cause the room or house temperature to depart from the desired value or values to an unnecessary extent. Still further, all commonly used heat sources, i. e. stokers, furnaces and radiators, lag more or less in responding to calls for more heat and less heat, the extent of the lag depending on previous periods of activation or deactivation, and hence the prior expedients used to reduce the annoyances of the simpler thermostatic arrangements, in reducing the frequency of the heat-source-activating and deactivating cycles as compared with the simpler thermostatic arrangement, compound the effects of the lag in the heat source, with the result that the temperature of the space to be heated frequently overshoots and undershoots the desired temperature to an extent considerably greater than that represented by the "temperature difference", and this effect is aggravated by the regular or occasional occurrence of a greater "temperature difference" than is necessary.

In contrast to this, my invention involves a lesser "temperature difference" between the activation of the heat source and its more or less complete deactivation, and a greater frequency of the activating and deactivating cycles. To this end I employ a thermostatic element responsive immediately to the temperature of the space being heated, generally speaking, and a time device, as it were, to impose a delay of a certain period of time between some or all successive changes in the condition of the heat source. These delays of mine, if imposed only between each activation and deactivation, are for periods (at least averaging) between say one-half or one minute and the time required for the heat source to raise the temperature of the space being heated about two degrees Fahr. If imposed only between deactivation and activation, they are for periods (at least averaging) between say one-half or one minute and something less than the time required for the temperature of the space to fall about two degrees Fahr.

To further explain the matter, it is pointed out in some prior commonly-used expedients to avoid the annoyances of the simple thermostatic system first mentioned above, the thermostatic element is so constructed that once it has acted (e. g. a bi-metallic element has warped) in a manner to activate the heat source, a change of temperature of some two degrees Fahr. is required to cause the thermostatic element to act reversely in a manner to deactivate the heat source. In contrast to this, my invention employs as before a thermostatic element subject to the temperature of the space being heated, but in lieu of a thermostat construction requiring a temperature change to cause a reversal of the operations, it employs a time device, as it were, to interpose a delay of a certain period of time between the movement of the thermostatic element to that extent (e. g. a certain bending of a bi-metallic element) which calls for activation of the heat source and the actual activation of the heat source. As compared with such prior systems, the delay imposed by my time device is for between, say, one-half or one minute and something less than the time required for the heat source to raise the temperature of the space about two degrees Fahr. Conversely of course, the timed delay may be imposed on the other half of the cycle; in that case the delay is for between say one-half or one minute and something less than the time taken for the temperature of the space being heated to fall about two degrees Fahr. As a third alternative a delay can be imposed in each half of each complete cycle.

The delays of successive cycles can be for equal periods, or for unequal periods. As an example of the latter, the time device may operate to render the thermostatic element effective to activate or deactivate the heat source at periodic intervals. Where such a periodic time device is employed to impose a delay on the activation of the heat source, the deactivation being instantaneously under the control of the thermostat, the time device should function at a frequency between about twice per minute and about once per hour; on the other hand, where a periodic time device imposes its delays on only the other half of the cycle, i. e. on the deactivation of the heat source, its frequency should be between about twice per minute and about once every ten minutes. While fixed periods of delay, and periodic operators of fixed periods, seem to be sufficient, it is to be understood that my invention includes both variable periods and variable frequencies as well.

While the invention as thus broadly expressed can be embodied in various forms, I believe preferable, as a specific form of my invention, those arrangements or forms wherein action of the thermostatic element is required to cause activation or increased activation of the heat source for sufficient time to materially change the state of the heat source on which the control system works. Also I believe preferable those arrangements or forms of the broader invention wherein the delay is imposed during only one-half of each activating- and deactivating cycle, the initiation of the other half of each cycle following substantially instantaneously after the movement of the thermostatic element corresponding to the arrival of the temperature at the thermostatic element at some certain degree; this degree need not be constant however, but it may be variable; for example, variable with the momentary rate of temperature rise or fall at the thermostatic element. It is preferable too, I believe, that the delay be imposed on the activation. Various embodiments of these specific forms of my invention are illustrated and described hereafter.

A further part of my invention has to do, primarily, with the elimination of the effect of the delay mechanism on the occurrence of an unusual or extraordinary condition. If, for example, the time device is arranged to impose a delay on the activating of the heat source, and the temperature of the space being heated or to be heated is materially below the temperature desired at the moment (say a matter of two or three or more degrees Fahr. below), this further part of my invention causes an immediate actuation of the heat source. Likewise, if a delay is imposed on the deactivation of the heat source, a similar expedient can be employed to bring about an immediate deactivation of the heat source on the rising of the temperature materially above the desired degree. To this end I employ a thermostatic element arranged to change the condition of the heat source (activate or deactivate it, as the case may be) directly and substantially instantaneously after the need has arisen. This thermostatic element can be a thermostatic element separate and distinct from the thermostatic element on the operations of which the delay is imposed, or it may be the same thermostatic element with additional connections through which it can act by reason of extraordinary movement resulting from the extraordinary condition. The effect can be transmitted to the heat source by requiring the time device or some part of it to assume the appropriate activating (or deactivating) position immediately, or by action around the time device.

Also, certain specific forms of my invention wherein no relays are used, and which are better described with reference to certain figures of the accompanying drawings, not only incorporate the foregoing matters of my invention, but also incorporate in systems without relays the underlying principle of an invention of one William M. Schweickart and for which an application for Letters Patent by him is being filed on an even date herewith. By this further matter the heat source is operated in steps as it were. While the temperature of the space being heated stands below a certain degree, the heat source is operated at a certain high rate, for example continuously; between this degree and some higher degree the heat source is operated at a lower rate, for example periodically activated or deactivated; above the latter degree the heat source rate is further reduced, for example deactivated to a minimum degree. Instead of there being only three steps, there may be more. This tends to reduce, particularly, overshooting due to lag in the heat source.

From the foregoing and the hereinafter described examples of my invention as applied to temperature control, the application of my invention to other conditions will be evident.

It will be understood that while hereinabove and hereafter I use the words "activate", "deactivate" and similar words with reference to the heat source, my invention is not limited to complete cessation of heat supply on "deactivation", but, from a broader aspect, includes a bare change of rate of heat supply. Also while the periods of delay are, for the most part, herein described as independent of temperature, it is to be understood that my invention includes modification of the time delay periods, for example in accordance with the momentary temperature, temperature change rate, etc.

Other objects of the invention include the details and arrangement of the specific systems to be hereinafter shown and described and set forth in the appended claims.

Additional objects of the invention will become apparent as the description thereof proceeds.

For a more complete understanding of the invention, reference may be had to the following description and accompanying drawings in which:

Fig. 9 is a schematic showing of a further modification of the invention and showing how the relays of the previous figures may be dispensed with, Fig. 10 is a diagram showing a modified form of the system of Fig. 9, Fig. 11 illustrates the manner in which a thermal timer may be utilized in place of a mechanical timer in a system which operates similar to the manner in which the system of Fig. 9 operates, and Fig. 12 is a schematic wiring diagram of a still further modification of the invention.

Figure 1:
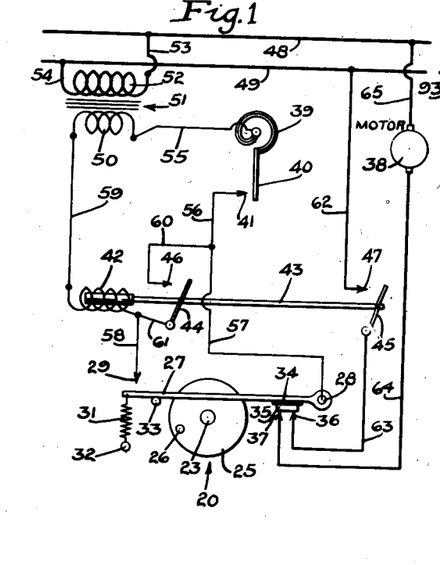
Fig. 1 is a schematic diagram showing one embodiment of the present invention.
Figure 2:
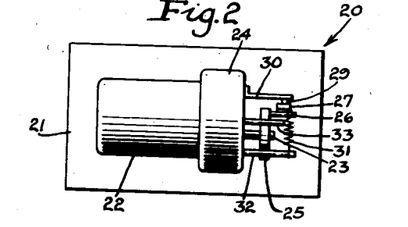
Fig. 2 is a side view of the timing mechanism utilized in the system of Fig. 1.
Figure 3:
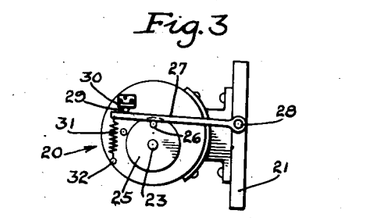
Fig. 3 is an end view of the timing mechanism of Fig. 2.

Referring first to Figs. 1, 2 and 3, a timer mechanism generally indicated at 20 comprises a mounting panel 21 to which is secured a suitably enclosed electric motor 22 which constantly drives a shaft 23 at reduced speed by means of a gear reduction housed in casing 24. The speed of the motor 22 and the gear reduction housed in casing 24 are preferably so arranged that the shaft 23 rotates at a speed explained above, that is to say at a speed generally less than about one rotation per half minute and something greater than one rotation in the time required for the room temperature to fall 2° Fahr., and preferably about two to twelve rotations per hour. A disc 25 is secured to shaft 23 for rotation therewith and carries a crank pin 26 which is adapted, upon rotation of disc 25, to periodically engage the underside of a lever 27 which is pivoted at 28 on mounting panel 21. Upon raising of lever 27 by crank pin 26, the lever 27 is brought into engagement with a contact 29 which is carried by a spring finger 30 herein shown as secured to the casing 24 which encloses the reduction gear train. A coiled spring 31 has one of its ends secured to the outer free end of lever 27 and has its other end secured to a pin 32 also shown as carried by the casing 24 of the reduction gear train whereby the coiled spring 31 biases the lever 27 in a direction to move the same from engagement with the contact 29. A stop pin 33, likewise shown as secured to the casing 24 of the reduction gear train, limits the movement of lever 27 under the bias of coiled spring 31.

In the timing mechanism shown in Fig. 1, the lever 27 also carries a block of insulating material 34 to which is secured a contact plate 35 that is adapted to bridge contacts 36 and 37 when the lever 27 is in engagement with stop pin 33. The motor 22 of the timing mechanism is constantly energized with the result that in the timing apparatus schematically shown in Fig. 1, the lever 27 is periodically raised by crank pin 26 to disengage contact plate 35 from contacts 36 and 37 for relatively short periods and to move lever 27 into engagement with contact 29 for relatively short periods and is periodically returned to the position shown by means of the coiled spring 31.

The system of Fig. 1 illustrates a temperature control system for heating purposes and the temperature changing means is illustrated as a motor 38 which may be a stoker motor or any other electrically operated device for raising the temperature of a space or room to which a thermostat responds. The thermostat is shown as comprising a bimetallic thermostatic element 39, a contact blade 40, and a cooperating contact 41 which preferably responds to a change of condition of the heat source, such as a room thermostat. Upon a fall in the room temperature to which bimetallic element 39 responds, contact blade 40 moves into engagement with contact 41. The system of Fig. 1 further includes a relay comprising a relay coil 42 which, upon energization, attracts an armature 43 that moves switch arms 44 and 45 into engagement with contacts 46 and 47. Upon deenergization of relay coil 42, armature 43 returns to the position shown in Fig. 1 wherein switch arms 44 and 45 are disengaged from contacts 46 and 47 respectively. High voltage electrical power is supplied by line wires 48 and 49. Low voltage electrical power is supplied by the low voltage secondary 50 of a transformer 51 having a high voltage primary 52 which is connected to line wires 48 and 49 by means of wires 53 and 54.

In the operation of the system of Fig. 1, lever 27 is periodically raised into engagement with contact 29. This engagement of lever 27 with contact 29 in itself does not complete a circuit through relay coil 42. When the temperature to which bimetallic element 39 responds falls to a predetermined value, contact blade 40 engages contact 41 but again no circuit is completed through relay coil 42. However, when contact blade 40 is in engagement with contact 41 and at the same time lever 27 is raised into engagement with contact 29, then an energizing circuit for relay coil 42 is established as follows: secondary 50, wire 55, bimetallic element 39, contact blade 40, contact 41, wire 56, wire 57, lever 27, contact 29, wire 58, relay coil 42 and wire 59 to the other side of secondary 50. Energization of relay coil 42 attracts armature 43 as previously explained and moves switch arms 44 and 45 into engagement with contacts 46 and 47. Engagement of switch arm 44 with contact 46 establishes a holding circuit for relay coil 42 which is independent of switch arm 27 and contact 29 but is controlled by contact blade 40 and contact 41. This holding circuit is as follows: secondary 50, wire 55, bimetallic element 39, contact blade 40, contact 41, wire 56, wire 60, contact 46, switch arm 44, wire 61, relay coil 42 and wire 59 to the other side of secondary 50. Relay coil 42 will therefore remain energized until such time as the temperature to which bimetallic element 39 responds rises sufficiently to disengage contact blade 40 from contact 41. During the short period that lever 27 is in engagement with contact 29, the system may possible operate with annoying frequency but as soon as crank pin 26 has revolved sufficiently to allow switch arm 27 to disengage contact 29, then all possibility of such annoying high frequency operation will cease since the first time that contact blade 40 thereafter disengages contact 41, the relay coil 42 will be deenergized and cannot again be subsequently energized until lever 27 is again moved into engagement with contact 29.

When switch arm 45 has been moved into engagement with contact 47, then the stoker motor 38 will be energized as soon as lever 27 returns to the position shown in Fig. 1 wherein contact plate 35 bridges contacts 36 and 37. This circuit is as follows: line 49, wire 62, contact 47, switch arm 45, wire 63, contact 36, contact plate 35, contact 37, wire 64, stoker motor 38, and wire 65 to line 48. It will be noted that the stoker motor 38 cannot be energized during that period when lever 27 is in engagement with contact 29 when there is a possibility of high frequency operation of the thermostat, whereby current impulses will not be transmitted to stoker motor 38. The relay coil 42 will remain energized until contact blade 40 disengages contact 41 and during this time stoker motor 38 will remain in continuous operation with the exception that the current supplied thereto will be momentarily interrupted whenever the crank pin 26 operates lever 27 to raise contact plate 35 out of bridging relation with contacts 36 and 37. In many instances, it will be found possible to entirely eliminate the switch comprised by contact plate 35 and contacts 36 and 37. When contact blade 40 finally disengages contact 41 to deenergize relay coil 42, the holding circuit therefor will additionally be broken by reason of separation of switch arm 44 from contact 46 with the result that relay coil 42 cannot again be energized thereafter until lever 27 is again moved into engagement with contact 29.

The system of Fig. 1 therefore provides an arrangement by means of which a variable time delay is interposed between closing of the thermostat switch (comprised by contact blade 40 and contact 41) and energization of stoker motor 38. The amount of the time delay depends upon the position of crank arm 26 at the time contact blade 40 engages contact 41 and also depends upon the speed of rotation of disc 25. In this manner, a single circuit open contact bimetallic thermostat may be utilized with a minimum of high frequency operation without making too great a sacrifice in the sensitivity of the thermostat since while a short variable delay is interposed between engagement of contact blade 40 with contact 41 before the stoker motor 38 is energized, it will be noted that immediately upon separation of contact blade 40 from contact 41 stoker motor 38 is deenergized. It will also be noted that this delay does not depend upon further temperature fall in the space to be heated and is entirely independent thereof.

The switch 27—29 might be termed a starting switch which is operated independently of temperature changes whereas switch 40—41 is the holding switch controlled by temperature changes.

The system of Fig. 1 has been explained in connection with a heating system but it is apparent that this same system could be readily utilized in connection with a cooling temperature control system or any other desired type of control system. Likewise, while the delay has been herein shown as interposed between a call for heat by the room thermostat and the operation of the stoker motor, the delay could equally well be interposed between opening of the thermostat circuit and stopping of the stoker motor as will hereinafter become apparent in connection with other modifications of the invention.

Figure 4:
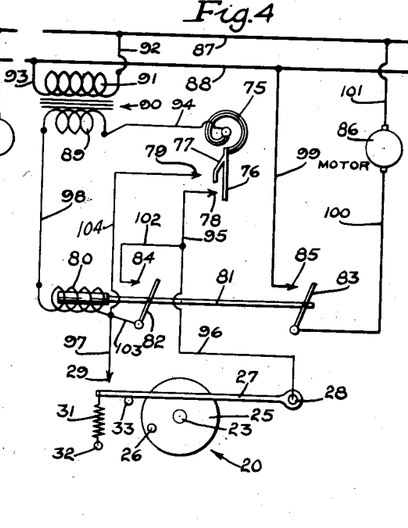
Fig. 4 is a schematic wiring diagram showing a modified form of the invention wherein certain additional features have been added to the system of Fig. 1.

Turning now to Fig. 4, the timer mechanism 20 is exactly the same as that utilized in Fig. 1 except that the supplemental motor switch comprised by contact plate 35 and contacts 36 and 37 has not been shown although it will be understood that the same could be utilized in the system of Fig. 4 if desired. The parts of the timer mechanism 20 of the system of Fig. 4 have been referenced to correspond with the similar parts of the timer mechanism 20 of Figs. 1, 2 and 3.

The control system of Fig. 4 is again shown as a heating system of temperature control and includes a space or room thermostat comprising a bimetallic element 75 which, upon cooling, sequentially moves contact blades 76 and 77 respectively into engagement with contacts 78 and 79. As is usual in such thermostats, contact blade 77 engages contact 79 at a temperature substantially 2° lower than that at which contact blade 76 engages contact 78 and, similarly upon temperature rise, contact blade 77 disengages contact 79 at a temperature about 2° lower than that at which contact blade 76 disengages contact 78. The system of Fig. 4 includes a relay comprising a relay coil 80 which, upon energization, attracts an armature 81 that in turn moves switch arms 82 and 83 into engagement with contacts 84 and 85 respectively. The temperature changing means is again shown as an electrically operated motor 86 which may control a stoker or any other suitable temperature changing means. High voltage power is supplied by line wires 87 and 88 and low voltage power is supplied by the low voltage secondary 89 of a step-down transformer 90 having primary 91 which is connected to line wires 87 and 88 by wires 92 and 93.

When the temperature of the space or room falls sufficiently to cause contact blade 76 to engage contact 78, the relay coil 80 will be energized the next time lever 27 is moved into engagement with contact 29 by the following circuit provided contact blade 76 and contact 78 are still engaged: secondary 89, wire 94, bimetallic element 75, contact blade 76, contact 78, wire 95, wire 96, lever 27, contact 29, wire 97, relay coil 80 and wire 98 to the other side of secondary 89. Armature 81 is thereupon attracted and moves switch arms 82 and 83 into engagement with contacts 84 and 85 respectively. Engagement of switch arm 83 with contact 85 energizes stoker motor 86 by the following circuit: line 88, wire 99, contact 85, switch arm 83, wire 100, stoker motor 86, and wire 101 to line 87. As hereinbefore stated, the supplemental motor switch operated by lever 27 which is utilized in the system of Fig. 1 could also be used in the system of Fig. 4 and in case of such use, this supplemental motor switch would be interposed in the wire 100. Engagement of switch arm 82 with contact 84 establishes a holding circuit for relay coil 80 which is independent of the switch comprised by lever 27 and contact 29 and this holding circuit is as follows: secondary 89, wire 94, bimetallic element 75, contact blade 76, contact 78, wire 95, wire 102, contact 84, switch arm 82, wire 103, relay coil 80 and wire 98 to the other side of secondary 89.

It will be noted that thus far the system of Fig. 4 corresponds exactly with the system of Fig. 1 except for the omission of the supplemental motor switch which may be used if desired. As pointed out in connection with Fig. 1, the stoker motor 86 of Fig. 4 will be operated an indefinite time interval after engagement of contact blade 76 with contact 78. Where a relatively long timing period is used or if the room temperature should drop exceedingly quickly, it may happen that the room temperature will drop 2° below the desired point before lever 27 is moved into engagement with contact 29. In such case, contact blade 77 will engage contact 79 before lever 27 is moved into engagement with contact 29 and energize relay coil 80 independently of the switch comprised by lever 27 and contact 29. This circuit is as follows: secondary 89, wire 94, bimetallic element 75, contact blade 77, contact 79, wire 104, relay coil 80 and wire 98 to the other side of secondary 89. The stoker motor 86 therefore can be operated independently of any time delay provided the room temperature decreases sufficiently. Upon such energization of relay coil 80, switch arm 82 will be moved into engagement with contact 84 whereupon the previously described holding circuit for relay coil 80 will be established with the result that operation of the stoker motor 86 will be maintained after contact blade 77 disengages contact 79 and until contact blade 76 disengages contact 78 upon a rise in room temperature. The system of Fig. 4 therefore might be said to comprise a temperature control system in which a thermostat having a predetermined differential is utilized, together with means associated with the thermostat for operating the temperature changing means at least a portion of the time during which the room or space temperature is between the permissible maximum and minimum limits. Also the system of Fig. 4 might be described as a temperature control system in which the temperature changing means is activated at least a portion of the time during which the temperature to be controlled is between certain permissible limits, is activated continuously when the temperature deviates from one of the permissible limits in one direction and is continuously deactivated when the temperature deviates from the other permissible limit in the opposite direction. As applied to a heating system, the system of Fig. 4 continuously operates means for increasing the supply of heat when the temperature to be controlled falls below a predetermined minimum, is operated to supply no heat when the temperature to be controlled reaches a predetermined maximum value and is operated at least a part of the time when the temperature to be controlled is between the minimum and maximum limits.

Figures 5, 6, 7, 8:
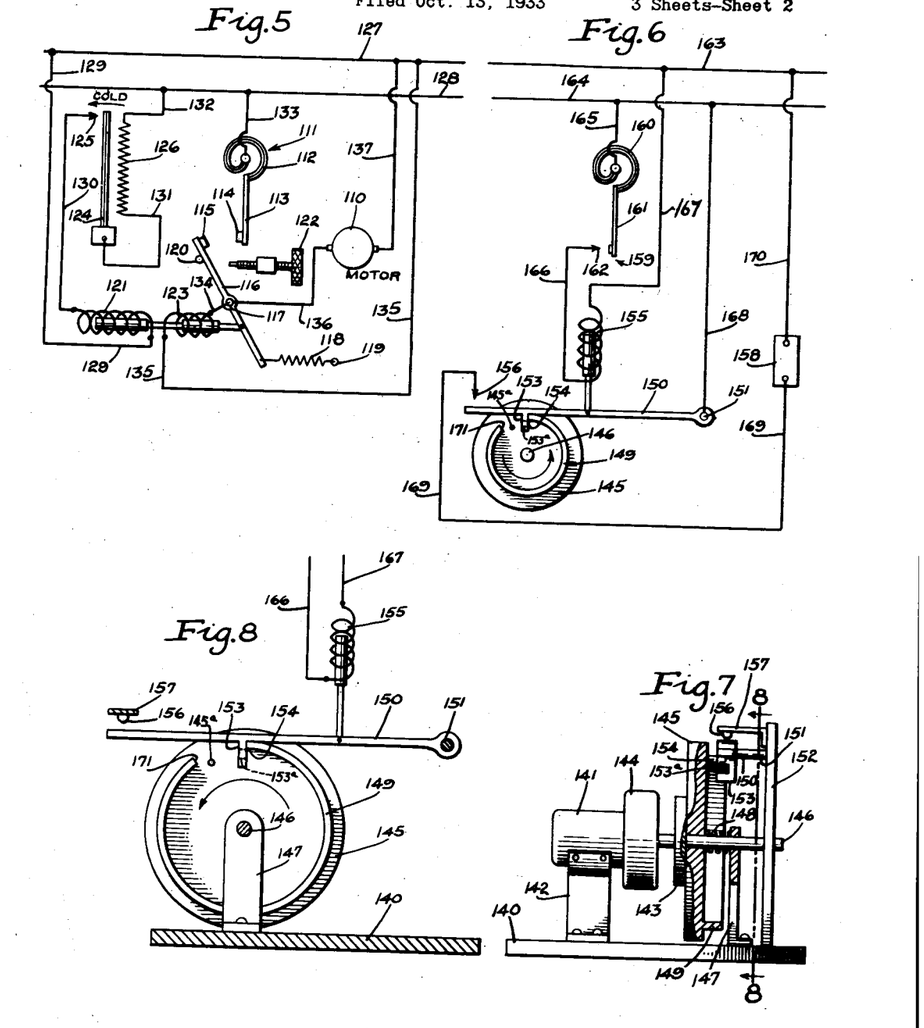
Fig. 5 is a schematic wiring diagram of a further modification of the invention.
Fig. 6 is a schematic wiring diagram of a still further modification of the invention.
Fig. 7 is a side view of the timing mechanism utilized in the system of Fig. 6 and has certain parts in section.
Fig. 8 is a sectional view of the timing mechanism of Fig. 7 and is taken about on the line 8—8 of Fig. 7.

Turning now to Fig. 5, a considerably different type of system is illustrated insofar as mechanical details, and arrangement of parts is concerned although the system of Fig. 5 has operating characteristics which are similar to those found in the systems of Figs. 1 and 4. The system of Fig. 5 is again shown as a heating system which includes a motor 110 that may well represent any desired type of electrically operated temperature changing means such as a stoker motor and also includes a room thermostat generally indicated at 111. The room thermostat 111 includes a bimetallic actuator 112 which operates a blade 113 that carries contact 114. The cooperating contact 115 instead of being stationary (except possibly for purposes of manual adjustment) as is usual in construction of thermostats of this general type is mounted upon an armature 116 which is pivoted at 117. A coiled spring 118 which has one of its ends secured to armature 116 and its other end secured to a stationary pin 119, biases armature 116 into engagement with a stop pin 120 whereby contact 115 is moved out of the normal range of movement of cooperating contact 114. A magnetic pull coil 121 cooperates with armature 116 and, when energized, is adapted to attract armature 116 and move the same out of engagement with stop pin 120 and bring contact 115 within the normal range of movement of contact 114. An adjustable stop screw 122 limits the movement of armature 116 when attracted by pull coil 121. Also associated with armature 116 is a magnetic holding coil 123 which, when energized, is adapted to maintain or hold armature 116 in its attracted position but is unable to move armature 116 from the position shown in Fig. 5 to its other position in which it engages stop screw 122. The system of Fig. 5 also includes timing mechanism but in this system the timing mechanism has been shown as a thermal timer instead of a mechanical timer. This thermal timer comprises a bimetallic strip 124, one end of which is secured and the other end of which is adapted, upon cooling of the bimetallic strip 124, to engage a contact 125. The timer further includes a heating element 126 which, when energized, serves to heat bimetallic strip 124 and cause the free end of the same to move out of engagement with contact 125. Power is supplied by wires 127 and 128.

With the parts in the position shown, the bimetallic strip 124 has been heated sufficiently to disengage contact 125 and is now cooling. As the bimetallic strip 124 continues to cool, its free end will engage contact 125 and establish a circuit as follows: line 127, wire 129, pull coil 121, wire 130, contact 125, bimetallic strip 124, wire 131, heating element 126 and wire 132 to line 128. Energization of heating coil 126 again begins to heat bimetallic strip 124 to cause the free end thereof to move out of engagement with contact 125. Energization of pull coil 121 attracts armature 116 and moves the same into engagement with stop screw 122 with the result that contact 115 is brought within the normal range of movement of contact 114. If, at this time, the temperature of the room or space is below the desired value, contacts 114 and 115 will become engaged. Such engagement of these contacts establishes energizing circuits for stoker motor 110 and for hold coil 123. The energizing circuit for hold coil 123 is as follows: line 128, wire 133, bimetallic element 112, blade 113, contact 114, contact 115, armature 116, wire 134, hold coil 123, and wire 135 to line 127. The energizing circuit for stoker motor 110 is as follows: line 128, wire 133, bimetallic element 112, blade 113, contact 114, contact 115, armature 116, wire 136, stoker motor 110 and wire 137 to line 127. Armature 116 will be retained or held in its attracted position by hold coil 123 irrespective of the condition of pull coil 121. Heating of bimetallic strip 124 by heating coil 126 finally will cause the free end thereof to disengage contact 125 and deenergize heating coil 126 and pull coil 121 whereupon bimetallic strip 124 will again begin to cool and repeat the above cycle whereby the circuit through heating coil 126 and pull coil 121 is intermittently made and broken. As previously pointed out however, armature 116 having once been moved to its attracted position by pull coil 121 will remain therein as long as hold coil 123 is energized, the energization of which in turn is dependent upon engagement of contacts 114 and 115. Similarly stoker motor 110 will remain energized as long as contacts 114 and 115 are in engagement. When the room or space temperature is restored to the desired value bimetallic element 112 will move contact 114 out of engagement with contact 115 whereupon stoker motor 110 and hold coil 123 will be deenergized. If, at this time, pull coil 121 is also deenergized armature 116 will return to the position shown in Fig. 5.

It will therefore be seen that this system operates very similarly to the manner in which the system of Fig. 1 operates in that a fall in the temperature of the room or space to be heated below the desired value in itself is not sufficient to start operation of stoker motor 110. This fall in room temperature must be accompanied by movement of contact 115 and this movement of contact 115 takes place a variable time interval after the room temperature has fallen below the desired value. The contact 125 and bimetallic strip 124 comprise a switch which might be termed a "starting switch" in that this switch must be closed to cause pull coil 121 to attract armature 116 before the room thermostat 111 is able to initiate stoker operation. In a similar manner contacts 114 and 115 might be said to comprise a "holding switch" in that upon engagement of these contacts the stoker motor 110 remains energized until contact 114 recedes from the position at which it engages contact 115.

In the system of Fig. 5 as in the other systems hereinbefore described, a single circuit room thermostat is utilized but a great deal of the possibility of undesirable high frequency operation is eliminated while retaining a large part of the thermostat sensitivity by the association therewith of a starting switch that is operated independently of changes in the temperature of the room or space to be controlled. More specifically, a variable time delay is interposed between a fall in the room temperature below the desired value and initiation of stoker operation.

Turning now to Figs. 6, 7 and 8, the system of Fig. 6 includes a timing mechanism which is shown in detail in Figs. 7 and 8. A base 140 supports an electric motor 141 by means of a suitable bracket 142. Motor 141 drives a friction disc 143 through a suitable gear reduction housed in a casing 144 so that the friction disc 143 is driven at a speed of not more than about one revolution per half minute, and not less than one revolution in less than the amount of time required to change the temperature of the space being heated about two degrees Fahr. The friction disc 143 is abutted by a timing disc 145 which is mounted on a shaft 146 journaled in a bracket 147 and an end plate 152 which in turn are mounted upon base 140. A coiled spring 148 abuts bracket 147 and timing disc 145 to constantly bias the latter into engagement with friction disc 143. An arcuate track 149 is mounted upon timing disc 145 and concentric with the axis thereof, it being noted that the track 149 does not form a complete circle. A lever 150 is pivoted on a pin 151 which is carried by end plate 152 and this lever 150 is provided with a downward extension 153 which, with the parts in the position shown, lies in the path of and is abutted by the end 154 of track 149. Such engagement of the end 154 of track 149 with projection 153 prevents rotation of timing disc 145 but the motor 141, which is continuously energized, is allowed to continue to rotate by reason of the slipping between friction disc 143 and timing disc 145. The extension 153 is provided with a gateway 153a. An electromagnetic coil 155, when energized, is adapted to lift lever 150 and bring the gateway 153a of extension 153 into registry with track 149 whereupon timing disc 145 is allowed to rotate in a counter-clockwise direction as viewed in Figs. 6 and 8, as indicated by the arrows. Such movement of lever 150 brings the same into engagement with a contact 156 which is carried by a flexible blade 157 that is preferably secured to end plate 152. The disc 145 is provided with a pin 145a which will pass through gateway 153a when lever 150 is in its lowermost position but which engages the lower end of extension 153 when the lever 150 is raised by electromagnetic coil 155.

Referring particularly to Fig. 6, the device 158 indicates any electrically controlled temperature changing device such as the stoker motor hereinbefore described in connection with Figs. 1, 4 and 5. The system of Fig. 6 includes a room thermostat 159 which comprises a bimetallic actuator 160 that controls a contact blade 161 which is adapted upon lowering of the temperature to which bimetallic element 160 responds to engage a contact 162. Power is supplied by line wires 163 and 164.

With the parts in the position shown in Fig. 6, the extension 153 is in the path of and abutted by the end 154 of track 149 so that timing disc 145 is stationary. The temperature of the room or space is above the desired value and contact blade 161 of room thermostat 159 is out of engagement with contact 162. Lever 150 is out of engagement with contact 156 so that the temperature changing device 158 is deenergized and no heat or minimum heat is being supplied to the room or space to be heated. The temperature of the room or space will therefore lower and when a predetermined minimum temperature is reached contact blade 161 will move into engagement with contact 162 and energize electromagnetic coil 155 by the following circuit: line 164, wire 165, bimetallic actuator 160, contact blade 161, contact 162, wire 166, electromagnetic coil 155, and wire 167 to line 163. Energization of electromagnetic coil 155 raises lever 150 into engagement with contact 156 and moves the gateway 153a of extension 153 into registry with track 149 whereupon timing disc 145 is released for rotation and begins to rotate in a counter-clockwise direction. Engagement of lever 150 with contact 156 energizes the temperature changing device 158 by a circuit as follows: line 164, wire 168, lever 150, contact 156, wire 169, temperature changing device 158 and wire 170 to line 163. The upper surface of gateway 153a rides upon the upper surface of track 149 and maintains lever 150 in its elevated position so that even though contact blade 161 of room thermostat 150 now leaves contact 162, the lever 150 will be maintained in engagement with contact 156 to maintain temperature changing device 158 energized. If the room thermostat is still or again calling for heat when disc 145 has substantially completed one revolution, so that electromagnetic coil 155 is energized, the lower end of extension 153 will be engaged by the pin 145a and further rotation of disc 145 will cease. Disc 145 will thereafter remain stationary until the room thermostat becomes satisfied and deenergizes electromagnetic coil 155 to release lever 150. When lever 150 is released, it will move to its lower position and gateway 153a will move into registry with pin 145a whereupon disc 145 will return to its initial position wherein the extension 153 is abutted by track 149 and the disc 145 is stationary. If, on the other hand, the electromagnetic coil 155 is deenergized when disc 145 has substantially completed a revolution, lever 150 will immediately drop to bring gateway 153a into registry with pin 145a and the parts will return to their original position.

In the system of Fig. 6 therefore, immediately upon a call for heat resulting in engagement of contact blade 161 of room thermostat 159 with contact 162 thereof, a circuit to the temperature changing device 158 will be completed and will thereafter be maintained completed until the timing disc 145 has made substantially one complete revolution or cycle. The timing disc 145 is assured of making substantially one complete revolution even though the blade 161 substantially immediately separates from contact 162. In this manner, a minimum firing period is insured and furthermore there will always be a variable delay between opening of the room thermostat and deenergization of the temperature changing device, this variable delay depending entirely upon the position of the end 171 of track 149 in respect to the projection 153 of lever 150 at the time the room thermostat opens the circuit to electromagnetic coil 155. After the minimum firing period, the control is returned to the room thermostat. The system of Fig. 6 therefore again demonstrates another manner in which a single circuit bimetallic open contact thermostatic switch may be utilized with a minimum of high frequency operation without greatly sacrificing any of the sensitivity of the apparatus. The system of Fig. 6 further demonstrates that the delay may be interposed between satisfying of the room thermostat and termination of operation of the temperature changing device instead of being interposed between a call for heat by the room thermostat and initiation of operation of the temperature changing device, the latter operation having been shown in the previously described systems.

Figures 9, 10, 11, 12:
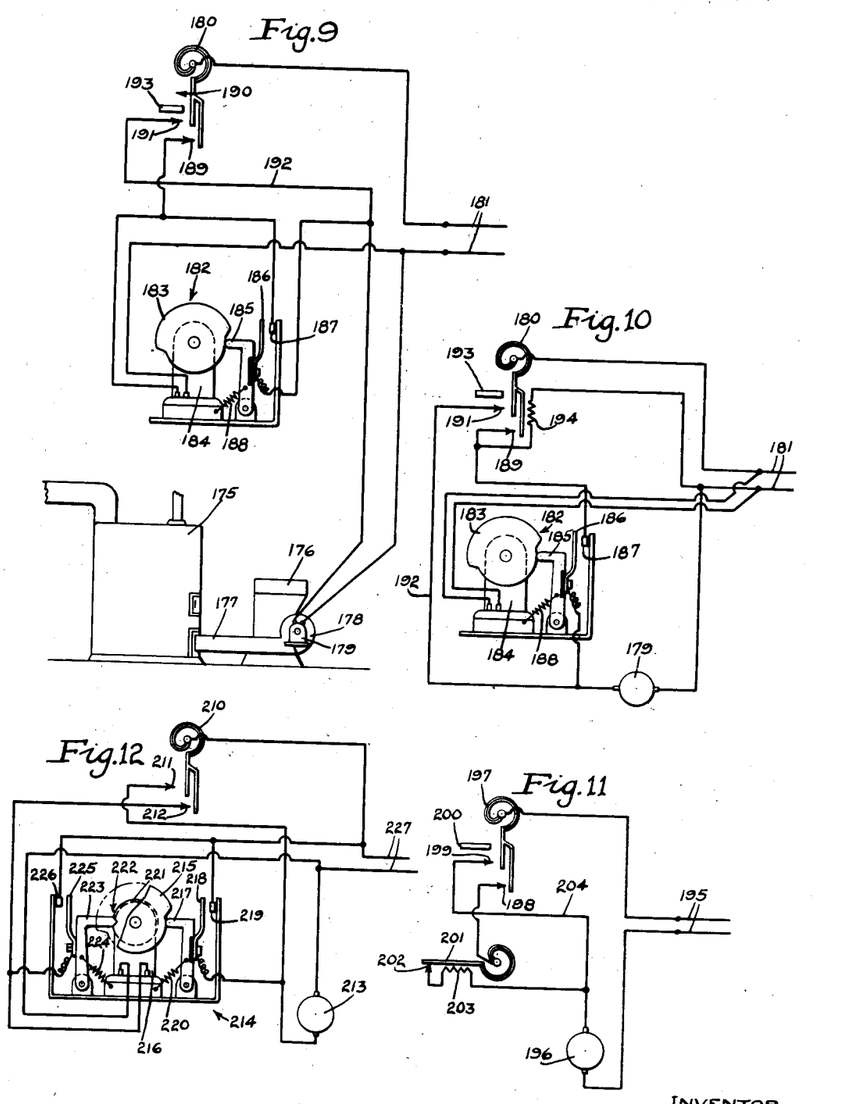

Turning now to Fig. 9, at 175 is a household heating furnace, which is fired by a coal stoker of which the coal hopper 176, coal and air conveyor 177 leading therefrom to the furnace, blower 178 for providing the combustion air, and electric motor 179 for driving the blower and fuel conveyor, will be recognized. As is apparent from this figure, the motor 179 illustrates specifically the motor of a furnace stoker; in a broader and more general sense, the motor 179 of this figure is also representative of any kind of power device operating in any way to vary the heat supplied by the furnace 175.

The temperature of the room or building heated by the furnace 179 is controlled by a thermostat 180 located therein or otherwise made responsive to the temperature of the room or building. At 181 is indicated the supply lines or source of electric power for the motor 179. At 182 is illustrated the intermittently operating device which is here shown as consisting of a cam disc 183, driven by an electric motor 184, and having a cam follower in the form of a hinged member 185 provided with an electrical contact 186 for engagement with the fixed electrical contact 187. Contact 186 is shown insulated from the cam follower 185, and contact 187 insulated from its carrying standard. A spring 188 will serve to hold the cam follower 185 in engagement with the edge of the cam disc 183. The cam disc 183, when rotating, is rotated at a rate of the order previously indicated, say of about one rotation in every ten minutes, and as illustrated serves to hold the contacts 186 and 187 in engagement for about half of each rotation, and permits the two to stand disengaged for the other half of each rotation. One side of the supply line 181 is connected to one side of the motor 179. The other side of the motor 179 is connected to the contact 186. Contact 187 is connected to a fixed contact 189 of the room thermostat 180. The bimetallic element 180 of the thermostat is connected to the opposite side of the current source or supply line 181. The driving element for the intermittently operating device 182, namely the electric motor 184, is connected in series with the fixed contact 189 of the thermostat 180 across the supply lines 181. The bimetallic element of the thermostat 180 moves in the direction of the arrow 190 as the temperature falls. It will be apparent therefore, that so long as the temperature of the thermostat 180 (or say the temperature of the space to be heated) is above that degree at which the bimetallic element engages the fixed contact 189, the intermittently operating device 182 remains inoperative, but when the temperature is below this degree (and the bimetallic element is engaged with contact 189) the intermittently operating device 182 closes the motor switch 186 and 187 intermittently, thereby operating the stoker motor 179 intermittently (and hence coal and fuel are fed to the stoker intermittently), for periods of five minutes each, the motor 179 (and coal and air feeds) remaining at rest during the intervening five-minute periods. This intermittent operation may continue until the temperature at the thermostat 180 rises again to the degree at which the bimetallic element will separate from the stationary contact 189. When this occurs, both the intermittently operating device 182 and the stoker motor 179 are deprived of current, and hence come to rest.

The stationary contact 189 is so related to the bimetallic element of the thermostat 180, that the two engage and disengage at approximately the temperature which it is desired to maintain in the house or room containing the thermostat. A second stationary contact 191 of the thermostat is so placed as to be engaged by the bimetallic element at a little lower temperature than the contact 189, say at a temperature two or three degrees lower. This contact 191, acting through conductor 192, short-circuits the intermittently engaging contacts 186 and 187, when engaged by the bimetallic element and hence serves to maintain the stoker motor 179 in continuous operation so long as the engagement at 191 continues. Obviously therefore, the stoker is operated continuously at the lowest temperatures; is operated intermittently, say at five minute intervals, so long as the temperature is approximately that desired at the thermostat 180; and is held entirely inoperative when the temperature at the thermostat 180 is still higher, and above that desired.

In order to avoid any tendency there may be for the thermostat to chatter, that is to say, to intermittently open and close its circuits rapidly when the room thermostat is close to that degree which calls for a closing or opening, the thermostat may be provided with a permanent magnet 193 acting, say, in a direction to hold the bimetallic element in engagement with the contacts 189 and 191. The use of magnets for this purpose is understood, and hence the foregoing mention of magnet 193 will serve the present purposes.

Figure 10 is illustrative of the fact that the connection of the intermittently operating device to the thermostat in such a manner that the intermittently operating device is in operation only when the thermostat is calling for heat, is not an essential feature of a control system. The room thermostat 180 and the intermittently operating device 182 of this figure are exactly like the corresponding devices of Fig. 1, and bear corresponding reference characters. They need not be further described therefore. Also, the motor 179 can be assumed (for illustrative purposes) to be the motor of a furnace-and-stoker arrangement such as is shown in Fig. 9. The motor 184 of the intermittently operating device 182 is permanently connected directly across the supply lines or source 181 in Fig. 10, and hence runs continuously; however, the contacts 186 and 187 are connected in series with the thermostat 180 at the contact 189. Excepting for the fact that the motor 184 (and hence disc 183) are in continuous operation (rather than in operation only while the thermostat is calling for heat) the operation is exactly like the operation of the arrangement of Fig. 9.

Devices and arrangements such as I have described, for example, can be made a little more sensitive by, for example, biasing the room thermostats in the opposite direction to the bias given by the permanent magnet 193, or biasing in opposition to such a bias. This is illustrated by the electric heater 194 which appears in Fig. 10 as an auxiliary. This heater serves to heat the thermostat 180 slightly, once the thermostat operates to close the circuit at contact 189, and thereby cause the thermostat to open this circuit at a somewhat lower temperature than it would do otherwise. As shown in this figure, the heating element 194 can be connected in series with the contact 189, across the supply line 181, so that the element is heated, and supplies heat to the bimetallic element of the thermostat, as and when the circuit is closed at contact 189, but is entirely deprived of current while the circuit is broken at this point. Such heating elements as auxiliaries to thermostats are well known and the foregoing description will suffice for the present purposes.

It is to be observed of course that this phase of my invention is not entirely limited to intermittently operating devices of the type shown at 182 in Figs. 9 and 10. Intermittent devices of quite other sorts may be used instead. A single example embodying another form or type is shown in Fig. 11. The supply lines, or source of current 195 will be recognized, and the motor 196 represents a heat-controlling power device like, for example, the motor 179 of Figs. 9 and 10. As before, the thermostat 197 is provided with two stationary contacts 198 and 199, and a permanent biasing magnet 200, similar in all respects to parts 180, 189, 191 and 193 of Figs. 9 and 10. The intermittently operating device however, comprises a bimetallic (thermostat) element 20 which, when cool, engages with the fixed contact 202, and which is provided with an electric heater (e. g. a resistance wire) 203 which, when sufficiently heated for a little time, causes the bimetallic element 201 to separate from the contact 202. The bimetallic element 201, contact 202, and heater 203 are connected in series with the motor 196 and the contact 198 of the room thermostat 197, across the supply source 196. As before, the contact 199 of the room thermostat (which is engaged by the bimetallic element of the room thermostat at a somewhat lower temperature than the contact 198) is connected in parallel with the intermittently operating device 201, 202, 203 by the conductor 204. The operation of this device is obvious: So long as the temperature of the room to be heated is above that degree at which contact 198 is engaged, no current is supplied to the motor 196, and the latter remains inoperative. When the bimetallic element of the room thermostat engages contact 198, current flows to and operates the motor 196, and also passes through the heating element 203; shortly thereafter the heat produced by the heating element 203 causes the bimetallic element 201 to leave the contact 202, thus both stopping the motor 196 and depriving the heating element 203 of current; thereupon the heating element 203 and the bimetallic element 201 begin to cool, and in the course of time 201 again engages with 202, and (assuming that the circuit remains closed at contact 198) the cycle repeats. Should the temperature be or fall to a still lower degree, say after the bimetallic element of the room thermostat 197 engages with contact 199, thereafter of course (so long as the circuit continues closed at 199) current is supplied to the motor 196 independently of the intermittently operating device and therefore this motor operates continuously.

It is not to be understood that permanent magnets like 193 and 200 of Figs. 9, 10 and 11, or any other mechanism, device or arrangement tending to reduce chattering at the room thermostat, or to minimize the effect of such chattering, is entirely an essential to this phase of the invention. Nothing of the sort may be necessary under some circumstances. However, I contemplate that usually something to minimize or eliminate such chattering, or the effect of such chattering, will be desirable in these particular modifications. But when desirable, the effect is not necessarily obtained by biasing at the room thermostat. Generally speaking, anything serving the purpose may be employed.

Fig. 12, as in the case of the system of Fig. 6, illustrates an arrangement wherein the effect of chattering is eliminated by causing an adjustment of the heating device, once called for by the room thermostat, to persist for at least a certain definite length of time; or to state the matter in another way, reverse adjustments called for by the room thermostat are made subject to delay for intervals of time which may be entirely independent of any and all temperature changes occurring at the room thermostat. These intervals of time are of the order before indicated and such length that the thermostat will usually have taken a definite position one way or the other, and either firmly closed or definitely opened its circuit or circuits. This result is secured by providing a circuit for keeping the intermittently operating device in operation for say at least ten minutes, each time the thermostat calls for heat.

In Fig. 12, the room thermostat 210 with its fixed contacts 211 and 212 corresponds in all respects to the room thermostat 180 with its contacts 189 and 191 respectively of Fig. 9 (the permanent magnet 193 of Fig. 9 being omitted however). Likewise, the motor 213 can be regarded as driving a stoker, exactly like the motor 179 in Fig. 9. The intermittently operating device 214 has a cam disc 215, driving motor 216 therefor, cam follower 217, contacts 218 and 219, and cam follower spring 220. In addition, the shaft carrying the cam disc 215 is also provided with a second cam disc 221 entirely circular except for a single narrow notch 222. For this cam disc 221 a hinged cam follower 223 is provided, having a spring 224 to keep it in engagement with the cam disc 221; and provided with a contact 225 for engagement with the fixed contact 226; the arrangement is such that contact 225 engages 226, except when the notch 222 stands opposite the cam follower 223. The source of current, as before, is at 227. It will be observed that the operating motor 213 is connected in series with the contacts 218 and 219 across the supply line 227. Likewise, the driving element or motor 216 of the intermittently operating device 214, is connected in series with the (higher temperature) contact 212 of the room thermostat, across the supply line 227. Figure 12 illustrates the room thermostat and intermittently operating device in the positions they have when the temperature of the room is above the desired degree. It will be observed that the circuit through operating motor 213, and also the circuit through the motor 216 of the intermittently operating device, are both open, and hence both of these motors are at rest.

As the temperature of the room falls and the room thermostat closes its circuit at contact 212, the motor 216 of the intermittently operating device begins to rotate; as it begins to rotate, cam follower 223 is thrust out of the notch 222 in cam disc 221, and thereby contact 225 is engaged with contact 226. It will be observed that this closes a circuit through the motor 216 of the intermittently operating device, across the supply line 227, quite independent of the thermostat contact 212. Regardless therefore of whether or not the engagement at contact 212 is broken immediately after it is made (i. e. by chattering at the thermostat) the intermittently operating device must continue in operation for at least one complete revolution; at the end of this revolution, cam follower 223 will drop into notch 222 and open the holding circuit at 225-226; during this rotation, contact 217 has engaged contact 219 for say, five minutes, and hence the operating motor 213 has been activated for five minutes to raise the temperature to which the room thermostat 210 responds. If this has served to raise the temperature to which room thermostat 210 responds, sufficiently to definitely open the circuit at 212, the intermittently operating device now stops, but otherwise continues to make at least one more complete rotation of its cam disc. In other words, the intermittently operating device always operates for one or more intervals of ten minutes each (assuming the speed of rotation is one rotation per ten minutes) but the motor 213 is energized only a portion of this time whereas in the system of Fig. 6, the device 158 is energized during a complete revolution of the timing disc 145. If the temperature falls to the point where the circuit is closed at contact 211, the motor 213 is put into continuous operation as before, and as will be apparent from the drawings.

It will be readily appreciated that many changes and modifications can be made to the system hereinbefore disclosed without departing from the inventions therein set out and I intend, therefore, to be limited only in the perview of the appended claims.

I claim as my invention:

1. In an automatic fuel supply control system, a room thermostat, fuel supply means, constantly operating timing means, means associated with the room thermostat and timing means for controlling the operation of the fuel supply means including a relay circuit having therein a pair of room thermostat contacts and a second pair of contacts under the control of said timing means and opened and closed thereby several times a day, a second pair of room thermostat contacts closed at a different temperature than said first pair, and a second relay circuit controlled by said second pair of contacts.

2. In a control system, a main control having first and second pairs of cooperating contacts, electromagnetic means, a continuously operating timer, a second pair of contacts opened and closed by the timer several times a day, an energizing circuit for the electromagnetic means including one pair of said main control contacts and said timer contacts, and control means associated with and operated by said electromagnetic means, a second circuit for said electromagnetic means controlled by the other pair of said main control contacts.

3. In a control system, a single circuit switch responsive to a condition, a starting switch operated independently of the condition to which the first mentioned switch responds, a device to be controlled, a starting circuit in control of said device including said single circuit switch and said starting switch in series, a holding switch automatically movable to closed position upon energization of the starting circuit, and a holding circuit including said holding switch and operative to control the device to be controlled independently of said starting circuit, said single circuit switch and said holding switch being connected in series in said holding circuit.

4. In a temperature control system, a room thermostat, a switch having a contact moved by said room thermostat, a temperature changing device, a starting circuit including said thermostat contact in control of the temperature changing device, a holding switch closed upon energization of the starting circuit, a holding circuit including the holding switch for maintaining said temperature changing device in operation, a third switch connected in the starting circuit in series with the thermostat switch but located outside the holding circuit, and means for periodically opening and closing said third switch independently of the room thermostat switch, said thermostat switch being inoperative to set up the holding circuit when said third switch is open.

5. In a control system, a highly sensitive and relatively delicate main control including a pair of contacts and responsive to a condition which it is desired to control, a second pair of contacts operated by means other than the condition it is desired to control, a relay, a holding switch operated thereby, an initial energizing circuit for said relay controlled only by said two pairs of contacts in series, a holding circuit for said relay controlled only by said pair of main control contacts and said holding switch, and a device for changing said condition controlled by the relay.

6. In a control system, a highly sensitive and relatively delicate main control including a pair of contacts and responsive to a condition which it is desired to control, a timer, a second pair of contacts operated by the timer, a relay, a holding switch operated thereby, an initial energizing circuit for said relay controlled only by said two pairs of contacts in series, a holding circuit for said relay controlled only by said pair of main control contacts and said holding switch, and a device for changing said condition controlled by the relay.

7. In a temperature control system, a highly sensitive and relatively delicate thermostat including a pair of main control contacts, a timer, a second pair of contacts operated by the timer, a relay, a holding switch operated thereby, an initial energizing circuit for said relay controlled only by said two pairs of contacts in series, a holding circuit for said relay controlled only by said pair of main control contacts and said holding switch, and a temperature changing device controlled by the relay.

8. In a temperature changing system, in combination, temperature changing means, electromagnetic means in control thereof, a holding switch moved to closed position by said electromagnetic means upon energization thereof, a temperature responsive actuator, a single circuit switch controlled thereby, timing means, a timer controlled switch, an initial energizing circuit for said electromagnetic means controlled by said second named switch and timer switch in series, and a holding circuit for said electromagnetic means controlled by said second named switch and holding switch in series, said holding circuit being independent of said timer switch.

9. A control system, comprising, a single circuit main control switch, electromagnetic means, two switches moved to closed position thereby when energized, a timer, a first timer switch periodically closed thereby for periods of relatively short duration, a second timer switch moved to open position while said first timer switch is closed, an initial energizing circuit for said electromagnetic means controlled by said main control switch and first timer switch in series, a holding circuit for the electromagnetic means controlled by the main control switch and one of said electromagnetically operated switches in series and independent of said timer switches, electrical heat changing means, and a circuit therefor controlled by said second timer switch and the other of the electromagnetically operated switches.

10. In a temperature control system, a source of heat for the space to be heated, an element, movable by change of condition of said heat source and responsive substantially immediately to conditions at itself, to change the rate of heat production by said source, a time device which substantially periodically and at a frequency of between about twice per minute and less than once per hour renders said element momentarily effective to change the condition of said heat source in one direction and means to permit said element to maintain said change in one direction and to bring about a change of the condition of the heat source in the reverse direction substantially immediately upon appropriate movement of said element at any time.

11. In a temperature control system, a source of heat for the space to be heated, an element, movable by change of condition of said heat source and responsive substantially immediately to conditions at itself, to change the rate of heat production by said source, a time device which substantially periodically and at a frequency of between about twice per minute and less than once per hour renders said element momentarily effective to activate said heat source, and means to permit said element to maintain said heat source in activated condition and to deactivate the heat source substantially immediately on movement of said element to a deactivating position at any time.

12. In a heating installation, a source of heat for the space to be heated, and a control system therefor including a holding circuit to maintain a change of condition of said heat source, a starting circuit to initiate a change of condition of said heat source when said holding circuit is in a condition to maintain said change, a thermostatic element responsive to the condition of said heat source operative on one of said circuits, and a time device operative on the other of said circuits at intervals greater than one-half minute and less than one hour.

13. In a heating installation, a source of heat for the space to be heated, and a control system therefor including a holding circuit to maintain a change of condition of said heat source, a starting circuit to initiate a change of condition of said heat source when said holding circuit is in a condition to maintain said change, a thermostatic element responsive to the condition of said heat source to cause said holding circuit to cease maintaining said change of condition, and a time device operative on said starting circuit at intervals greater than one-half minute and less than one hour.

14. In a control system, a main control having a pair of cooperating contacts, electromagnetic means, a continuously operating timer, a second pair of contacts continuously opened and closed by the timer several times a day, an energizing circuit for the electromagnetic means including said main control contacts and said timer-operated contacts, control means associated with and operated by said electromagnetic means, and a holding circuit for said electromagnetic means controlled by said main control and independent of said timer-operated contacts.

15. In a control system, a pair of switches responsive to changes in a condition which are sequentially closed upon a change in said condition in one direction, a starting switch operated independently of the condition to which said first mentioned switches respond, a device to be controlled, a first starting circuit in control of said device including said starting switch and the first to close of said first-mentioned two switches, and a second starting circuit for said device controlled by the second to close of said first-mentioned switches.

16. In a control system, a pair of switches responsive to changes in a condition which are sequentially closed upon a change in said condition in one direction, a starting switch, means to periodically close said starting switch, a device to be controlled, a first starting circuit in control of said device including said starting switch and the first to close of said condition responsive switches, a holding switch automatically movable to closed position upon completion of said first starting circuit, a holding circuit in control of said device including said holding switch and the first to close of said condition responsive switches, and a second starting circuit in control of said device controlled by the last to close of said condition responsive switches.

GORDON M. PELTZ.